United States Patent
Shah (10) Patent No.: US 9,880,778 B2
(45) Date of Patent: Jan. 30, 2018

(54) MEMORY DEVICES AND METHODS

(71) Applicant: Google Inc., Mountain View, CA (US)

(72) Inventor: Monish Shah, Dublin, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/936,486

(22) Filed: Nov. 9, 2015

(65) Prior Publication Data

US 2017/0131908 A1    May 11, 2017

(51) Int. Cl.
    *G06F 3/06* (2006.01)
(52) U.S. Cl.
    CPC .............. *G06F 3/065* (2013.01); *G06F 3/061* (2013.01); *G06F 3/0604* (2013.01); *G06F 3/0631* (2013.01); *G06F 3/0644* (2013.01); *G06F 3/0685* (2013.01)
(58) Field of Classification Search
    None
    See application file for complete search history.

(56) References Cited

U.S. PATENT DOCUMENTS

| | | | | |
|---|---|---|---|---|
| 2002/0114178 A1* | 8/2002 | Sakui | ................... | G06F 13/4234 365/51 |
| 2002/0185337 A1 | 12/2002 | Miura et al. | | |
| 2006/0041711 A1 | 2/2006 | Miura et al. | | |
| 2007/0079065 A1 | 4/2007 | Bonella et al. | | |
| 2009/0157950 A1* | 6/2009 | Selinger | ............... | G06F 12/0246 711/103 |
| 2009/0198872 A1* | 8/2009 | Tzeng | ................. | G06F 12/0246 711/103 |
| 2009/0240871 A1* | 9/2009 | Yano | .................... | G06F 12/0246 711/103 |

(Continued)

FOREIGN PATENT DOCUMENTS

| | | | |
|---|---|---|---|
| JP | H07-114500 A | 5/1995 | |
| JP | H08-129509 | 5/1996 | |

(Continued)

OTHER PUBLICATIONS

European Search Report in European Application No. 16197750.9, dated Apr. 12, 2017, 8 pages.

(Continued)

*Primary Examiner* — Mano Padmanabhan
*Assistant Examiner* — Jean Edouard
(74) *Attorney, Agent, or Firm* — Fish & Richardson P.C.

(57) ABSTRACT

A memory device includes a plurality of NAND flash chips, a dynamic random access memory (DRAM) portion in data communication with the NAND flash chips, and a controller. Each NAND flash chip has a first storage capacity, and includes a memory section, each memory section including a plurality of pages. The DRAM portion has a second storage capacity that is at least as large as the first storage capacity. The controller is configured to select one of the NAND flash chips as a currently selected NAND flash chip for writing data, copy all valid pages in the currently selected NAND flash chip into the DRAM portion, and, in response to a write request to a logical memory location mapped to a particular physical location in one of the NAND flash chips, allocate the currently selected NAND flash chip for writing to a particular page that includes the particular physical location.

18 Claims, 6 Drawing Sheets

(56) References Cited

U.S. PATENT DOCUMENTS

| | | |
|---|---|---|
| 2009/0249015 A1 | 10/2009 | Tzeng |
| 2009/0313430 A1* | 12/2009 | Jones .................. G06F 19/3406 711/114 |
| 2010/0100668 A1 | 4/2010 | Huang |
| 2010/0205470 A1 | 8/2010 | Moshayedi et al. |
| 2010/0281204 A1* | 11/2010 | Yano .................. G06F 12/0246 711/103 |
| 2010/0312948 A1* | 12/2010 | Yano .................. G06F 11/1068 711/103 |
| 2010/0324005 A1 | 12/2010 | Bar-Or |
| 2011/0066790 A1* | 3/2011 | Mogul .................. G06F 12/023 711/103 |
| 2011/0078366 A1* | 3/2011 | Miura .................. G11C 5/02 711/103 |
| 2011/0191523 A1* | 8/2011 | Caulkins ............ G06F 12/0868 711/103 |
| 2011/0264859 A1 | 10/2011 | Yano |
| 2012/0072644 A1* | 3/2012 | Asano .................. G06F 12/0246 711/103 |
| 2012/0096215 A1* | 4/2012 | Zhang .................. G06F 12/0246 711/103 |
| 2012/0159072 A1* | 6/2012 | Hida .................. G06F 12/0862 711/119 |
| 2013/0086309 A1 | 4/2013 | Lee et al. |
| 2014/0101370 A1* | 4/2014 | Chu .................. G06F 12/06 711/103 |
| 2014/0281157 A1 | 9/2014 | Iwai |
| 2015/0134886 A1 | 5/2015 | Kim et al. |
| 2015/0242313 A1 | 8/2015 | Lee et al. |

FOREIGN PATENT DOCUMENTS

| | | |
|---|---|---|
| JP | 2009-032324 A | 2/2009 |
| JP | 2009-211232 | 9/2009 |
| JP | 2012-517645 | 12/2012 |
| JP | 2015-035010 A | 2/2015 |
| WO | WO 2013/016723 | 1/2013 |

OTHER PUBLICATIONS

Office Action issued in Korean Application No. 10-2016-0147560, dated Jun. 21, 2017, 8 pages (English translation).
Singaporean Search Report and Written Opinion issued in Singaporean Application No. 10201609225Q, dated Aug. 17, 2017, 9 pages.
Office Action issued in Taiwanese Application No. 105136404, dated Sep. 28, 2017, 5 pages (English translation).
Office Action issued in Japanese Application No. 2016-217980, dated Nov. 7, 2017, 11 pages (with Machine Translation).

* cited by examiner

MEMORY DEVICES AND METHODS

FIELD

The present specification generally relates to memory systems.

BACKGROUND

A wide variety of memory devices can be used to maintain and store data and instructions for various computers and similar systems. In conventional computing systems, Dynamic Random Access Memory (DRAM) technology has typically been employed to operate the dynamic memory of the computer in order for an application to operate at high speeds. However, DRAM used as main memory in computer systems is no longer scaling as rapidly as in the past. As a result, DRAM storage has become a limited resource in computing environments.

To address the limited DRAM, disk drives may be used as swap space to copy out infrequently used memory data from DRAM to the disk drive. The data may then be copied back to DRAM the next time it is used. However, in general, that process has severe performance consequences. Thus, that process is rarely used in modern servers. To address those performance consequences, NAND flash-based solid-state drives (SSDs) may be used as the swap space. However, even the use of NAND flash-based SSDs may have an undesirable impact on performance. For example, flash-based memory has certain limitations which include slower write times for data and latency associated with having to update entire sectors instead of individual addresses as in conventional systems that employ DRAM entirely for main memory.

SUMMARY

One innovative aspect of the subject matter described in this specification is embodied in a memory device that includes a plurality of NAND flash chips, a dynamic random access memory (DRAM) portion in data communication with the NAND flash chips, and a controller. Each of the plurality of NAND flash chips includes a memory section, such that each memory section includes a plurality of pages, and each NAND flash chip has a first storage capacity. The DRAM portion has a second storage capacity that is at least as large as the first storage capacity of each of the plurality of NAND flash chips. The controller is configured to select one of the NAND flash chips as a currently selected NAND flash chip for writing data, and copy all valid pages in the currently selected NAND flash chip into the DRAM portion. The controller is also configured to, in response to a write request to a logical memory location that is mapped to a particular physical location in one of the NAND flash chips, allocate the currently selected NAND flash chip for writing to a particular page that includes the particular physical location.

In certain implementations, the controller is configured to select another one of the plurality of NAND flash chips as a queued NAND flash chip for writing data after the currently selected NAND flash chip is identified as full, and to copy all valid pages in the queued NAND flash chip into the DRAM portion. In certain implementations, the controller is configured to read in to a main memory comprising DRAM a particular page from the plurality of NAND flash chips in response to a request to access the particular page stored in the plurality of NAND flash chips.

One innovative aspect of the subject matter described in this specification is embodied in methods that include the actions of selecting one of a plurality of NAND flash chips as a currently selected NAND flash chip for writing data, each NAND flash chip having a first storage capacity and including a memory section, and each memory section including a plurality of pages; and copying all valid pages in the currently selected NAND flash chip into a dynamic random access memory (DRAM) portion that is in data communication with the NAND flash chips, the DRAM portion having a second storage capacity that is at least as large as the first storage capacity of each of the plurality of NAND flash chips; and in response to a write request to a logical memory location that is mapped to a particular physical location in one of the NAND flash chips, allocate the currently selected NAND flash chip for writing to a particular page that includes the particular physical location.

In general, another aspect of the subject matter described in this specification may be embodied in methods that include the actions of selecting another one of the plurality of NAND flash chips as a queued NAND flash chip for writing data after the currently selected NAND flash chip is identified as full; and copying all valid pages in the queued NAND flash chip into the DRAM portion.

Another aspect of the subject matter described in this specification may be embodied in methods that include the actions of reading in to a main memory including DRAM a particular page from the plurality of NAND flash chips in response to a request to access the particular page stored in the plurality of NAND flash chips.

Other embodiments of these aspects include corresponding systems, apparatus, and computer programs, configured to perform the actions of the methods, encoded on computer storage devices.

These and other implementations may each optionally include one or more of the following features. For instance, the other one of the plurality of NAND flash chips is selected as a queued NAND flash chip based on having the fewest number of valid pages of the plurality of NAND flash chips. In certain implementations, the particular physical location to write data to the currently selected NAND flash chip is determined based on at least one of: (i) least accessed page and (ii) least recently used page.

In certain implementations, the memory section includes a partition of the respective NAND flash chip, and partitions allow the operation of a read in a first partition of the respective NAND flash chip during a write operation in another partition of the same NAND flash chip. In certain implementations, the memory section includes the respective constituent NAND flash chip.

In certain implementations, each NAND flash chip includes multiple partitions, each partition having a particular storage capacity and the second storage capacity of the DRAM portion is at least as large as the particular storage capacity of each partition. In certain implementations, each NAND flash chip includes multiple partitions, each partition having a particular storage capacity and the second storage capacity of the DRAM portion is either approximately equal to or approximately double the size of the particular storage capacity of each partition.

In certain implementations, the plurality of NAND flash chips are part of a module coupled to an input/output (I/O) bus, and the module further includes the DRAM portion, wherein the second storage capacity of the DRAM portion is approximately double the size of the first storage capacity of each NAND flash chip. In certain implementations, the plurality of NAND flash chips are coupled to an input/output (I/O) bus, and the DRAM portion is part of a main memory comprising DRAM. In certain implementations, the plurality of NAND flash chips and the DRAM portion are part of a module, and the second storage capacity of the DRAM portion is at least as large as double the first storage capacity of each NAND flash chip.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The memory system described below includes NAND flash chips that are in data communication with a portion of DRAM. Each NAND flash chip defines a memory section having a plurality of pages, and each NAND flash chip has a first storage capacity. The DRAM portion is in data communication with the NAND flash chips. The DRAM portion has a second storage capacity that is at least as large as the first storage capacity of each of the NAND flash chips.

The memory system also includes a controller that is configured to select one of the NAND flash chips as a currently selected NAND flash chip for writing data and then copy all valid pages in the currently selected NAND flash chip into the DRAM portion.

In response to a write request to a logical memory location that is mapped to a particular physical location in one of the NAND flash chips, the controller allocates the currently selected NAND flash chip for writing to a particular page that includes the particular physical location.

In certain implementations, a page may be selected to be removed from main memory (e.g., DRAM) and written to the NAND flash chip based on certain metrics, such as the least accessed page, the least recently used page, or the like, or any combination thereof.

Figure 1:
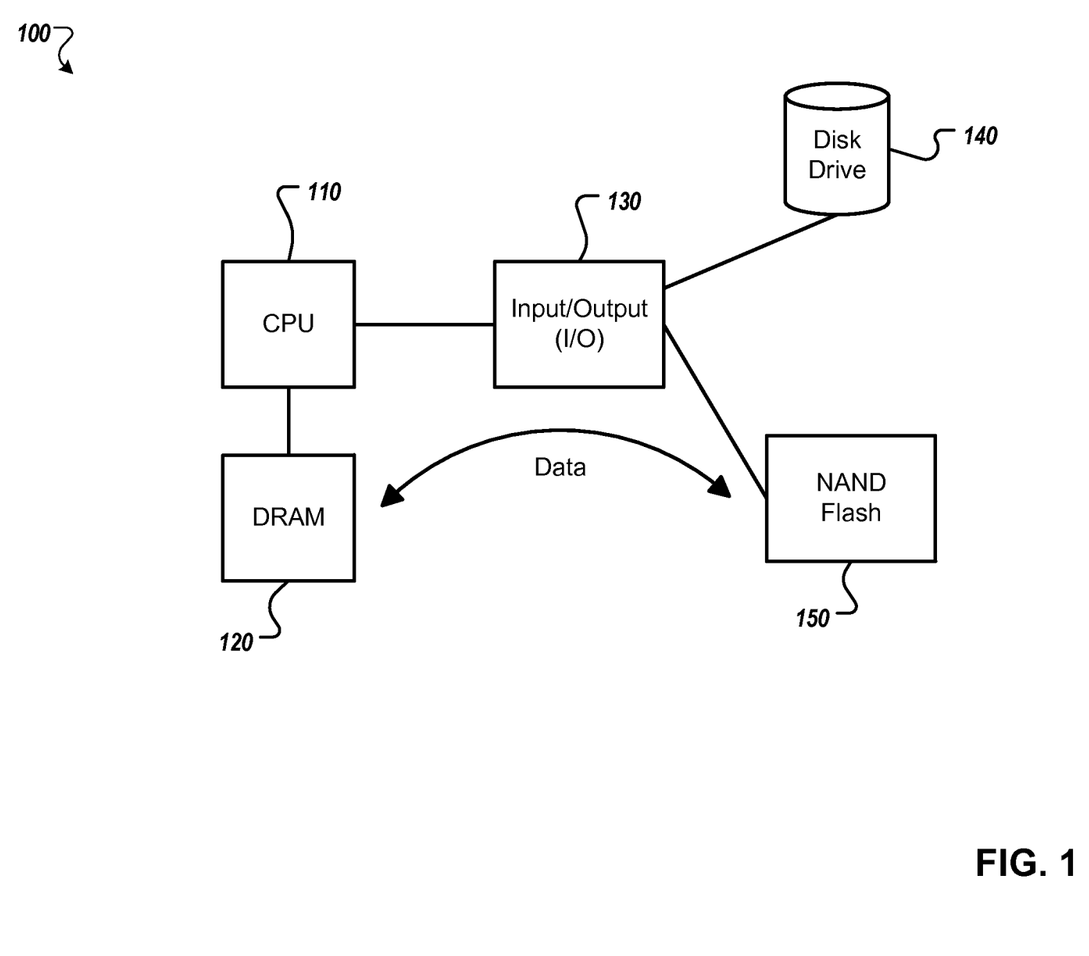
FIG. 1 depicts an example of a system including a memory device according to implementations of the present disclosure.
Figure 2A:
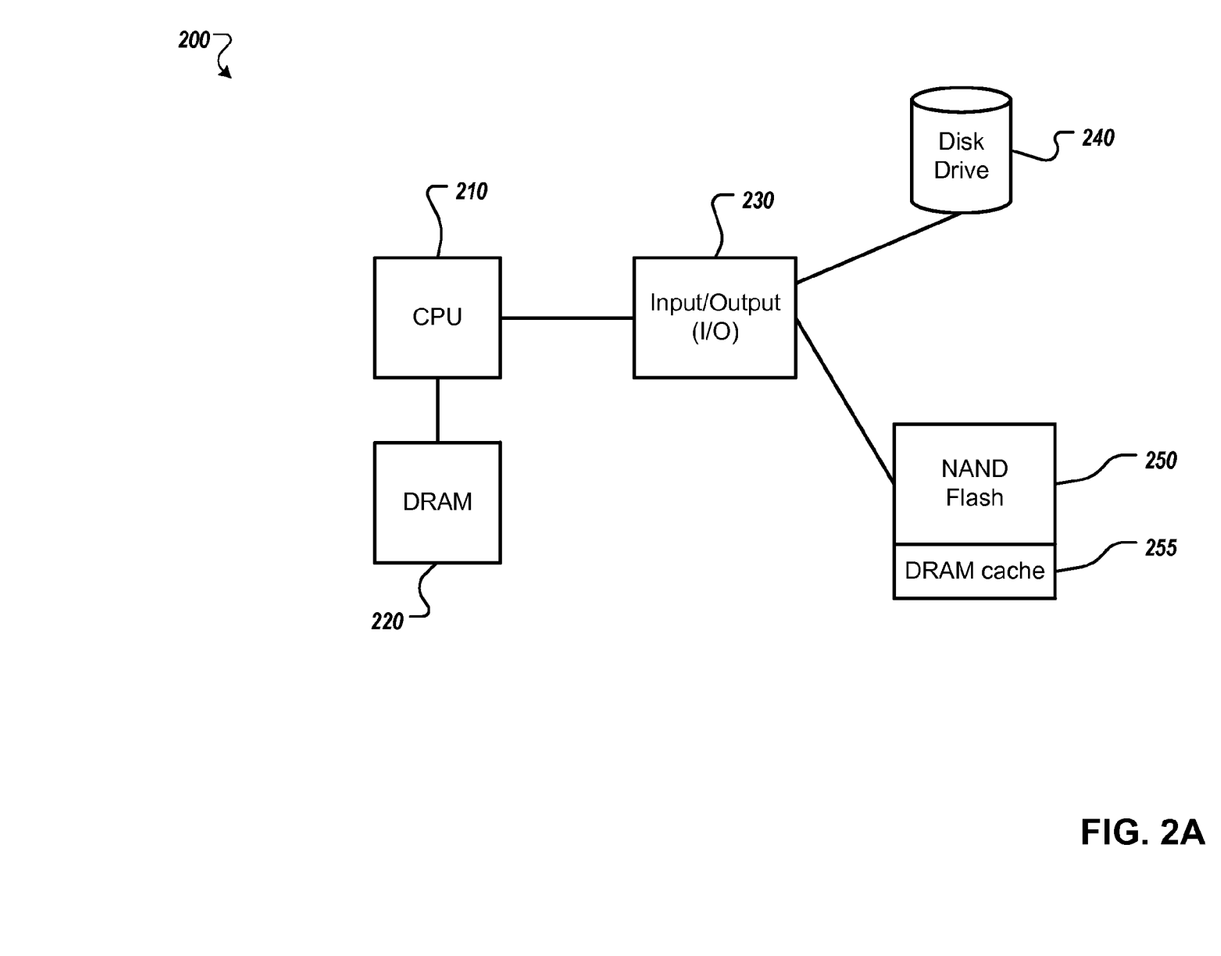
FIG. 2A depicts an example of a system including a memory device according to implementations of the present disclosure.
Figure 2B:
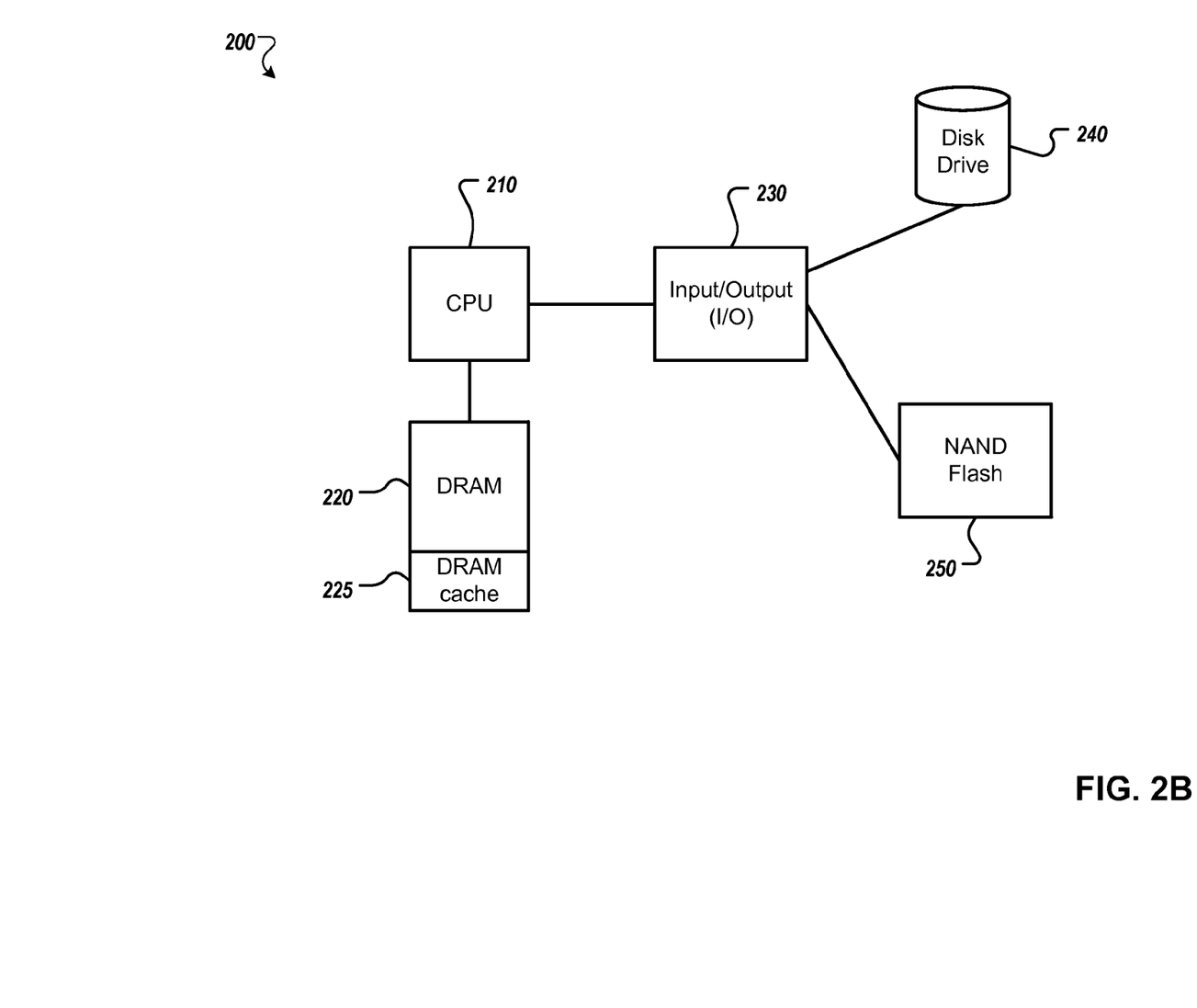
FIG. 2B depicts an example of a system including a memory device according to implementations of the present disclosure.
Figure 2C:
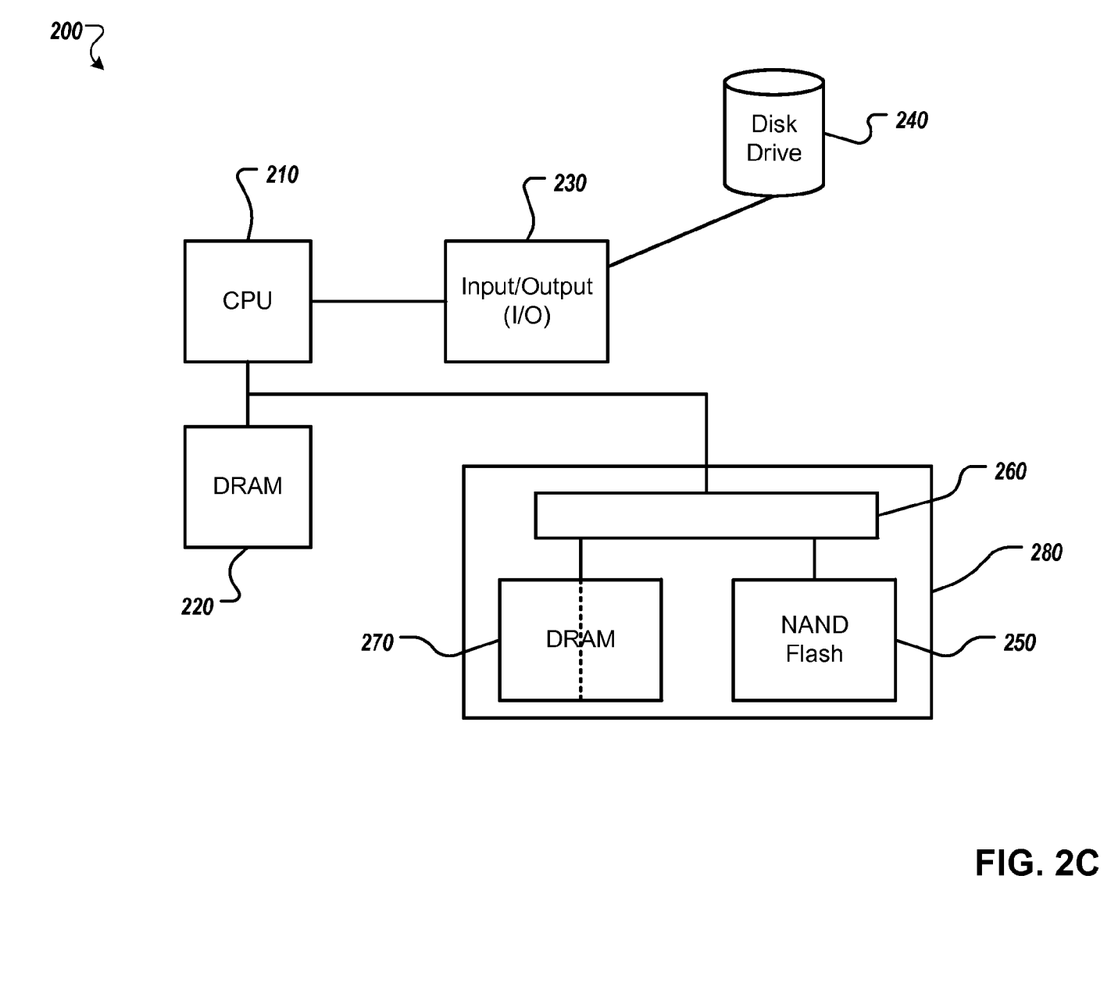
FIG. 2C depicts an example of a system including a memory device according to implementations of the present disclosure.

These memory systems may be included on a single packaged device, or may be distributed within a computer device. FIGS. 1-2C are example illustrations of how the memory system may be implemented in different variations.

FIG. 1 depicts an example of a system 100 including a memory device according to implementations of the present disclosure. The system 100 may include a processor, such as a central processing unit (CPU) 110, a DRAM portion 120, an input/output (I/O) bus 130, a disk drive 140, such as a hard disk drive (HDD), and a NAND flash memory portion 150. The I/O bus 130 may be the pathway used for input and output devices to communicate with the CPU 110. The I/O bus may be, for example, a Peripheral Component Interconnect Express (PCIe). The disk drive 140 may be used for long term storage of data.

The system 100 may be embodied in an electronic device, such as a computing device. The DRAM portion 120 may be a main memory and may be directly accessible to the CPU 110. The main memory may be primary storage that connects to a processor (e.g., CPU 110) using, for example, an address bus, which carries the memory address of the desired location, and a data bus, which is used to read or write the data.

When using flash memory as a swap space device, writing to flash memory requires an erase operation followed by a program operation. Those operations are typically much slower than read operations and while those operations are occurring, read operations are blocked. Thus, the average and the tail latency of reads may be detrimentally increased.

To address the issues described in the preceding paragraph, at any given time, one NAND flash chip may be selected for writing. All valid pages in the selected NAND flash chip may be read into the DRAM portion, so that there is no need to read from that NAND flash chip. Rather, reads may occur from the DRAM portion into which the valid pages in the selected NAND flash chip have been read. All new writes may be made to the selected NAND flash chip.

In addition, in some implementations, another NAND flash chip may be queued for writing next. In the case in which a second NAND flash chip is selected as a queued NAND flash chip, all valid pages in both the selected NAND flash chip and the queued NAND flash chip may be read into the DRAM portion, so that there is no need to read from those two NAND flash chips. All new writes may be made to the first, selected NAND flash chip. When that first NAND flash chip is full, subsequent writes may be made to the queued NAND flash chip, which then may become the current NAND flash chip for writing. A new NAND flash chip may be selected as the next, queued chip and all valid pages in that next, queued NAND flash chip may be read into the DRAM portion.

The pages from the first selected NAND flash chip, which is no longer written to, may be evicted from DRAM, as necessary. For example, each page may either be discarded, if it is not dirty, or written back to the flash memory.

When a NAND flash chip is selected for queueing to be the next, queued NAND flash chip, the selection may be based on the NAND flash chip with the fewest number of valid pages of the plurality of NAND flash chips eligible to be selected. Occasionally, for wear leveling reasons, a different choice may be made based on a wear leveling policy or procedure. Such techniques for wear leveling are known in the art, and include, for example, techniques of dynamic wear leveling and static wear leveling.

As described above, the system may have the main memory (e.g., DRAM) separate from the NAND flash memory, where the NAND flash memory is connected to the I/O bus, and the DRAM is not directly connected to the I/O bus, while the NAND flash memory is in data communication with the DRAM. However, in certain implementations, both the NAND flash memory and the DRAM portion serving as cache may be connected through the I/O bus separate from the main memory DRAM. For example, in FIG. 2A, the DRAM cache is depicted along with the NAND flash memory connected to the I/O bus.

FIG. 2A depicts an example of a system including a memory device according to implementations of the present disclosure. As depicted in FIG. 2A, the memory device of the present disclosure may be a dual in-line memory module (DIMM) that, for example, plugs into a server, similar to the way a normal DRAM DIMM would be used. However, the DIMM of the present disclosure may contain a first amount of DRAM 255 and a second, larger amount of NAND flash memory 250. An example system may have 32 GB of DRAM and 128 GB of usable NAND flash memory.

Similar to the description above with respect to FIG. 1, the system 200 depicted in FIG. 2A may also include a processor, such as a central processing unit (CPU) 210, a DRAM 220, an input/output (I/O) bus 230, and a disk drive 240, such as a hard disk drive (HDD). The memory device may contain the NAND flash memory 250 and a DRAM portion 255.

The DIMM may also have a controller configured to control both the DRAM portion 255 and the NAND flash memory 250. The DIMM and controller may be configured to use the NAND flash memory 250 as swap space as described herein. The DRAM portion 255 may have a storage capacity approximately equal to the amount needed to cache the NAND flash chip that is currently being written. Alternatively, the DRAM portion 255 may have a storage capacity approximately equal to the amount needed to cache the NAND flash chip that is currently being written and the queued NAND flash chip that is next to be written. The DRAM 220 may be used to store pages read in from NAND flash memory 250, for example, when the pages are requested. A typical page size may be, for example, 4 KB.

In the above example of a system having 32 GB of DRAM and 128 GB of usable NAND flash memory, the system may perform in a manner similar to a system having 128 GB of DRAM, even though there is only 32 GB of actual DRAM. That performance is created by having 128 GB of flash memory used in the manner described herein.

A virtual memory (VM) system or manager may control how program memory is utilized by one or more programs executing in accordance with an operating system. In general, when data is fetched from main memory, a determination is made as to whether or not read or write access is detected. Such determination can be triggered off of a page fault mechanism or other event. When a page is first accessed, the page may be copied from the flash memory into DRAM. The VM system may take a page fault when this happens. Reads and writes to the page may then be served from the DRAM copy. When a different page needs to be moved into DRAM, the current page may be simply discarded if it is not dirty or written back to the flash memory. For example, when the main memory is full and a new page from the flash memory needs to be brought in, a page may be selected based on replacement algorithms and discarded or pushed back to the flash if dirty, i.e., modified during its tenure in the main memory.

When any new memory needs to be allocated, it may be allocated out of the flash memory. It may or may not be cached in DRAM, according to a caching policy. A variety of such caching policies may be used, such as a least accessed page, a least recently used page, or the like, or any combination thereof. The caching may be managed by the VM system, which may operate in units of pages.

Using flash memory may require "copy on write", i.e., each time a logical address is written, the data will be at a new physical address. This requires a mapping table, which is also known. However, implementations of the present disclosure may rely on the virtual memory page table to accomplish this mapping.

As described with reference to FIG. 2A above, the system may have the DRAM cache integrated in the same package as the NAND flash chips. However, it is not necessary that all memory components be included in a same package. For example, in FIG. 2B, the DRAM cache is depicted as being separate from the NAND flash chips, but still in data communication with the NAND flash chips.

In particular, FIG. 2B depicts an example of a system including a memory device according to implementations of the present disclosure. The system 200 depicted in FIG. 2B may include a processor, such as a central processing unit (CPU) 210, a DRAM 220, a DRAM portion 225, an input/output (I/O) bus 230, a disk drive 240, such as a hard disk drive (HDD), and a NAND flash memory 250.

As depicted in FIG. 2B, the NAND flash memory 250 is on the I/O bus 230, while the DRAM portion 225 may be apportioned from main memory DRAM 220 to be utilized as the cache for the NAND flash chip that is currently being written. In certain implementations, the DRAM portion 225 may be dynamically apportioned as needed. Further, the DRAM portion 225 may be apportioned from main memory DRAM 220 to be utilized as the cache for the NAND flash chip that is currently being written and the queued NAND flash chip that is next to be written. The DRAM 220 may be used to store pages read in from NAND flash memory 250, for example, when the pages are requested.

As described with reference to FIG. 2B above, the system may have the DRAM cache apportioned from main memory DRAM with the NAND flash memory separately connected to the I/O bus. However, in certain implementations a hybrid DIMM containing both NAND flash memory and DRAM may be used separately from main memory DRAM. For example, in FIG. 2C, a DIMM is depicted as having NAND flash memory and a DRAM, where part of the DRAM may be apportioned as the DRAM portion to be utilized as the cache.

FIG. 2C depicts an example of a system including a memory device according to implementations of the present disclosure. The system 200 depicted in FIG. 2C may include a processor, such as a central processing unit (CPU) 210, a DRAM 220, an input/output (I/O) bus 230, and a disk drive 240, such as a hard disk drive (HDD). A DIMM 280 that includes both a NAND flash memory 250 and a DRAM portion 270 may be installed on the memory bus along with main memory DIMMs including DRAM 220.

The DIMM 280 may include a controller 260 configured to control both the DRAM portion 270 and the NAND flash memory 250. The DRAM portion 270 may have only a portion of its storage capacity utilized as the cache for the NAND flash chip that is currently being written. Thus, the portion of the DRAM portion 270 that is not utilized as the cache for the NAND flash chip that is currently being written may be utilized as normal DRAM. For example, that portion of DRAM portion 270 not utilized as cache may store pages that have been read in from the NAND flash memory 250 swap space.

In certain implementations, the DRAM portion 270 may have only a portion of its storage capacity utilized as the cache for the NAND flash chip that is currently being written and for the queued NAND flash chip that is next to be written. Thus, the portion of the DRAM portion 270 that is not utilized as the cache for the NAND flash chip that is currently being written the queued NAND flash chip that is next to be written may be utilized as normal DRAM, as described above.

The NAND flash memory referenced above with respect to FIGS. 1-2C may include several NAND flash chips. For example, in FIG. 3, NAND flash memory is depicted as a memory module that contains several NAND flash chips, where the module is connected to the I/O bus.

Figure 3:
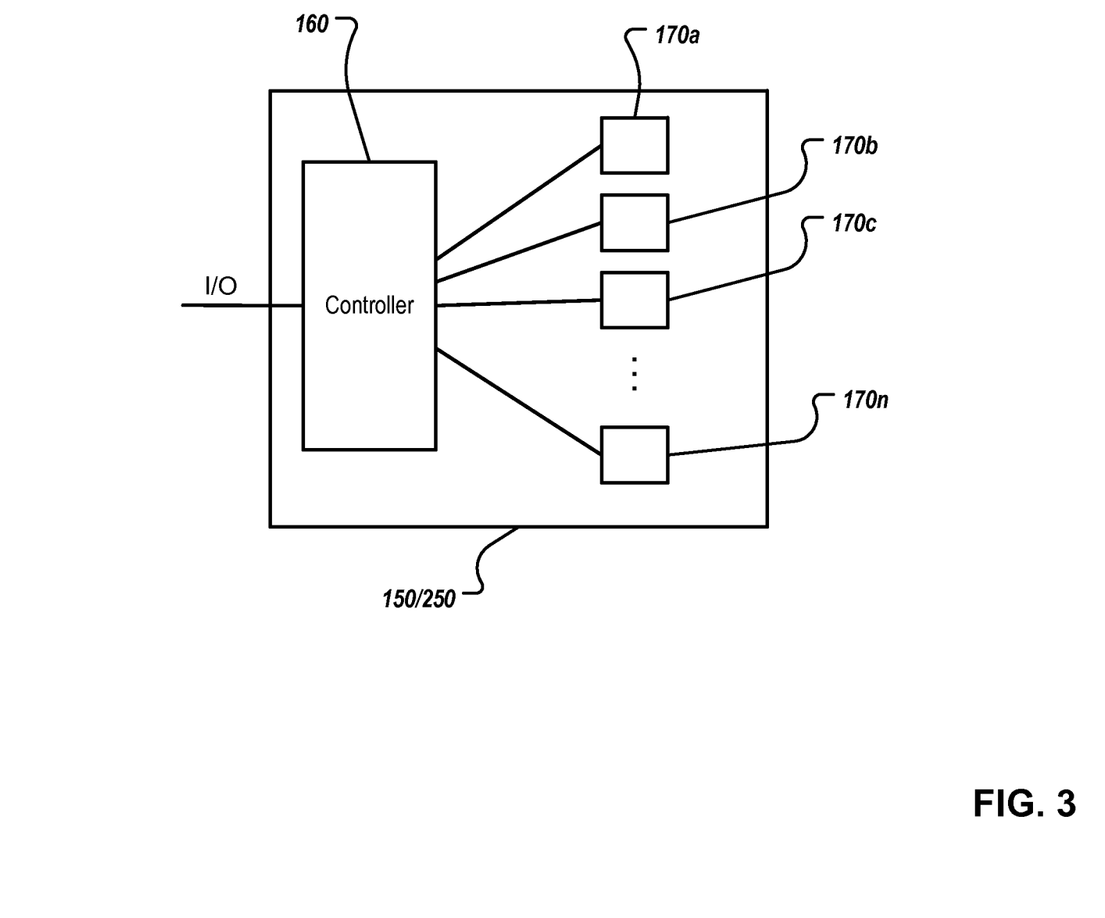
FIG. 3 depicts an example of a NAND flash module according to implementations of the present disclosure.

FIG. 3 depicts an example of a NAND flash module according to implementations of the present disclosure. NAND flash memory portion 150/250 may include a controller 160 and a set of n NAND flash chips 170a-170n. The NAND flash memory portion 150/250 may be in data communication with the DRAM portion 120. Any n number of NAND flash chips of any size may be used to achieve the desired storage capacity of the NAND flash memory portion 150/250. To create the desired storage space for the NAND flash memory portion 150/250, some overprovisioning may be required. For example, in a particular NAND flash memory portion 150/250, each NAND flash chip may be 4 GB. Thus, if storage space of 128 GB is desired for the NAND flash memory portion 150/250, thirty-two of such 4 GB NAND flash chips would be required for 128 GB. Assuming, for example, twenty-five percent overprovisioning, a total of forty NAND flash chips may be provided. This ensures that, for example, when all 128 GB of memory is used, each NAND flash chip, on average, will be 80% occupied, and less otherwise.

Each of the n NAND flash chips 170a-170n may include one or more memory sections. In other words, a memory section may be a respective constituent NAND flash chip or each NAND flash chip may include one or more partitions as memory sections. In the case that a NAND flash chip includes partitions, if a write operation is in progress in one partition, that write operation does not prevent a read operation to any other partition on the same NAND flash chip. In other words, the partitions allow the operation of a read in a first partition of the respective NAND flash chip during a write operation in another partition of the respective NAND flash chip.

In certain implementations, each NAND flash chip includes multiple partitions, each partition having a particular storage capacity. In such implementations, the storage capacity of the DRAM portion, e.g. the second storage capacity, may be at least as large as the particular storage capacity of each partition but less than the storage capacity of the constituent NAND flash chip. In particular, in certain implementations, the second storage capacity of the DRAM portion is either approximately equal to or approximately double the size of the particular storage capacity of each partition.

In the case that the NAND flash chips include partitions, a lesser amount of DRAM may be needed for the DRAM portion serving as cache than when the NAND flash chips do not include partitions. For example, if each NAND flash chip is 16 GB, and is divided into four partitions of 4 GB each, the DRAM portion as cache for the NAND flash memory may have a storage capacity of 4 GB, approximately equivalent to the size of one partition, or 8 GB, approximately equivalent to the size of two partitions. In contrast, without partitions, the DRAM portion may have 16 GB, approximately equivalent to the size of one NAND flash chip, or 32 GB, approximately equivalent to the size of two NAND flash chips.

Figure 4:
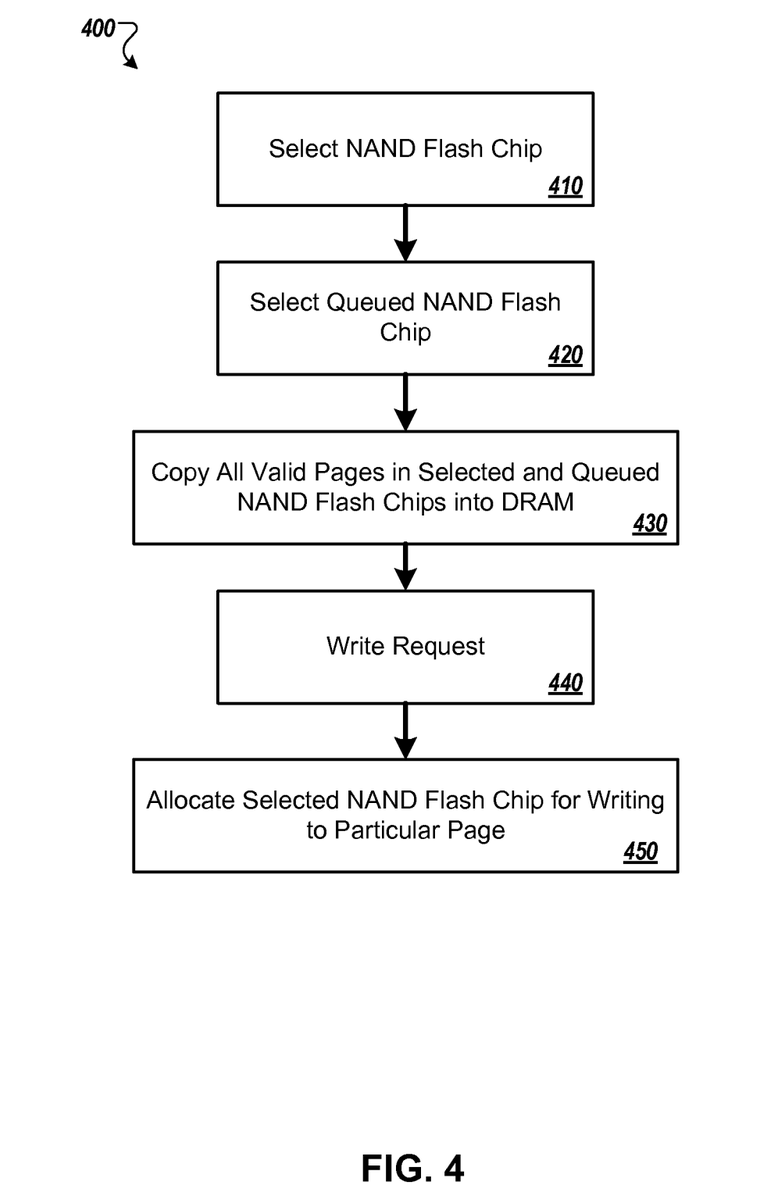
FIG. 4 depicts an example flowchart for a method according to implementations of the present disclosure.

FIG. 4 depicts an example flowchart for a method 400 according to implementations of the present disclosure. In order to implement flash memory as swap space, writes to the flash memory at die level may occur in accordance with the following process 400. One of the NAND flash chips that make up the NAND flash memory may be selected at 410 as a currently selected NAND flash chip for writing data. As described above, each NAND flash chip may have a particular storage capacity and may have a memory section that includes one or more pages. For example, a page size may be 4 KB. Alternatively, a page size may be greater than 4 KB, for example, any multiple of 4 KB, e.g., 8 KB, 256 KB, 2 MB.

In certain implementations, another one of the NAND flash chips that make up the NAND flash memory may be selected, at 420, as a queued NAND flash chip for writing data after the currently selected NAND flash chip is identified as full. In certain implementations, a queued NAND flash chip may not be used and the process may not include 420. In a case in which a queued NAND flash chip is selected, all valid pages in the currently selected NAND flash chip and the queued NAND flash chip are copied, at 430, into a DRAM portion that is in data communication with the NAND flash chips. In a case in which a queued NAND flash chip is not used, all valid pages in the currently selected NAND flash chip are copied, at 430, into a DRAM portion that is in data communication with the NAND flash chips. As described above, the DRAM portion may have a storage capacity that is at least as large as the storage capacity of each of the NAND flash chips.

In response to a write request to a logical memory location that is mapped to a particular physical location in one of the NAND flash chips at 440, the currently selected NAND flash chip is allocated, at 450, for writing to a particular page that includes the particular physical location. Thus, reads and write to the pages that were stored in the currently selected NAND flash chip and the queued NAND flash chip may be served from the DRAM copy, so that no reads need to occur from the currently selected NAND flash chip and the queued NAND flash chip. Rather, all new writes may go to the currently selected NAND flash chip, for example, until it is full. Then subsequent writes may go to the queued NAND flash chip, which becomes the NAND flash chip for writing, and a new NAND flash chip may be selected as the queued NAND flash chip. The process repeats, with all valid pages in the new queued NAND flash chip read into DRAM. Further, the pages from the first currently selected NAND flash chip, which is no longer written to, may be evicted from DRAM, as necessary.

While the descriptions of implementations of the present disclosure have included a single controller and a single assembly, certain implementations may include two separate controllers and assemblies. For example, one assembly with a controller may contain flash memory and another assembly with a controller may contain DRAM. Further, certain implementations may use existing system DRAM for the DRAM cache portion.

According to implementations of the present disclosure, NAND flash chips with faster access times that may be designed would provide even better performance. For example, by changing the circuit design of the NAND flash chips themselves, access times may be improved to 10 microseconds or less. Further, NAND flash chips may be designed with wider and faster interfaces, which allow the page transfer to be completed faster in accordance with implementations of the present disclosure.

A number of implementations have been described. Nevertheless, it will be understood that various modifications may be made without departing from the spirit and scope of the disclosure. For example, various forms of the flows shown above may be used, with steps re-ordered, added, or removed.

Implementations of the invention and all of the functional operations described in this specification can be implemented in digital electronic circuitry, or in computer software, firmware, or hardware, including the structures disclosed in this specification and their structural equivalents, or in combinations of one or more of them. Implementations of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

While this disclosure contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A memory device, comprising:
a plurality of NAND flash chips, each of the plurality of NAND flash chips comprising a memory section, wherein each memory section comprises a plurality of pages, and wherein each NAND flash chip has a first storage capacity;
a dynamic random access memory (DRAM) portion in data communication with the NAND flash chips, the DRAM portion having a second storage capacity that is at least as large as the first storage capacity of each of the plurality of NAND flash chips; and
a controller configured to:
select one of the NAND flash chips as a currently selected NAND flash chip for writing data;
copy all valid pages in the currently selected NAND flash chip into the DRAM portion; and
in response to a write request to a logical memory location that is mapped to a particular physical location in one of the NAND flash chips, allocate the currently selected NAND flash chip for writing to a particular page that includes the particular physical location;
wherein the plurality of NAND flash chips and the DRAM portion are part of a module coupled to a memory bus, and wherein the second storage capacity of the DRAM portion is at least as large as double the first storage capacity of each NAND flash chip.

2. The memory device of claim 1, wherein the at least one controller is configured to:
select another one of the plurality of NAND flash chips as a queued NAND flash chip for writing data after the currently selected NAND flash chip is identified as full; and
copy all valid pages in the queued NAND flash chip into the DRAM portion.

3. The memory device of claim 2, wherein the another one of the plurality of NAND flash chips is selected as a queued NAND flash chip based on having the fewest number of valid pages of the plurality of NAND flash chips.

4. The memory device of claim 1, wherein the particular physical location to write data to the currently selected NAND flash chip is determined based on at least one of: (i) least accessed page and (ii) least recently used page.

5. The memory device of claim 1, wherein the memory section comprises a partition of the respective NAND flash chip, and wherein partitions allow the operation of a read in a first partition of the respective NAND flash chip during a write operation in another partition of the same respective NAND flash chip.

6. The memory device of claim 1, wherein the memory section comprises the respective constituent NAND flash chip.

7. The memory device of claim 1, wherein the DRAM portion is part of a main memory comprising DRAM.

8. The memory device of claim 1, wherein the at least one controller is configured to:
read in to a main memory comprising DRAM a particular page from the plurality of NAND flash chips in response to a request to access the particular page stored in the plurality of NAND flash chips.

9. A memory device, comprising:
a plurality of NAND flash chips, each of the plurality of NAND flash chips comprising a memory section, wherein each memory section comprises a plurality of pages, and wherein each NAND flash chip has a first storage capacity;
a dynamic random access memory (DRAM) portion in data communication with the NAND flash chips, the DRAM portion having a second storage capacity that is at least as large as the first storage capacity of each of the plurality of NAND flash chips; and
a controller configured to:
  select one of the NAND flash chips as a currently selected NAND flash chip for writing data;
  copy all valid pages in the currently selected NAND flash chip into the DRAM portion; and
  in response to a write request to a logical memory location that is mapped to a particular physical location in one of the NAND flash chips, allocate the currently selected NAND flash chip for writing to a particular page that includes the particular physical location;
wherein the plurality of NAND flash chips are part of a module coupled to an input/output (I/O) bus, the module further comprising the DRAM portion, wherein the second storage capacity of the DRAM portion is approximately double the size of the first storage capacity of each NAND flash chip.

10. A method comprising:
selecting one of a plurality of NAND flash chips as a currently selected NAND flash chip for writing data, each of the plurality of NAND flash chips comprising a memory section, wherein each memory section comprises a plurality of pages, and wherein each NAND flash chip has a first storage capacity;
copying all valid pages in the currently selected NAND flash chip into a dynamic random access memory (DRAM) portion that is in data communication with the NAND flash chips, wherein the DRAM portion has a second storage capacity that is at least as large as the first storage capacity of each of the plurality of NAND flash chips; and
in response to a write request to a logical memory location that is mapped to a particular physical location in one of the NAND flash chips, allocate the currently selected NAND flash chip for writing to a particular page that includes the particular physical location;
wherein the plurality of NAND flash chips and the DRAM portion are part of a module, and wherein the second storage capacity of the DRAM portion is at least as large as double the first storage capacity of each NAND flash chip.

11. The method of claim 10, further comprising:
selecting another one of the plurality of NAND flash chips as a queued NAND flash chip for writing data after the currently selected NAND flash chip is identified as full; and
copying all valid pages in the queued NAND flash chip into the DRAM portion.

12. The method of claim 11, wherein the another one of the plurality of NAND flash chips is selected as a queued NAND flash chip based on having the fewest number of valid pages of the plurality of NAND flash chips.

13. The method of claim 10, wherein the particular physical location to write data to the currently selected NAND flash chip is determined based on at least one of: (i) least accessed page and (ii) least recently used page.

14. The method of claim 10, wherein the memory section comprises a partition of the respective NAND flash chip, and wherein partitions allow the operation of a read in a first partition of the respective NAND flash chip during a write operation in another partition of the same respective NAND flash chip.

15. The method of claim 10, wherein the memory section comprises the respective constituent NAND flash chip.

16. The memory device of claim 10, wherein the DRAM portion is part of a main memory comprising DRAM.

17. The method of claim 10, further comprising:
reading in to a main memory comprising DRAM a particular page from the plurality of NAND flash chips in response to a request to access the particular page stored in the plurality of NAND flash chips.

18. A method comprising:
selecting one of a plurality of NAND flash chips as a currently selected NAND flash chip for writing data, each of the plurality of NAND flash chips comprising a memory section, wherein each memory section comprises a plurality of pages, and wherein each NAND flash chip has a first storage capacity;
copying all valid pages in the currently selected NAND flash chip into a dynamic random access memory (DRAM) portion that is in data communication with the NAND flash chips, wherein the DRAM portion has a second storage capacity that is at least as large as the first storage capacity of each of the plurality of NAND flash chips; and
in response to a write request to a logical memory location that is mapped to a particular physical location in one of the NAND flash chips, allocate the currently selected NAND flash chip for writing to a particular page that includes the particular physical location;
wherein the plurality of NAND flash chips are part of a module coupled to an input/output (I/O) bus, the module further comprising the DRAM portion, wherein the second storage capacity of the DRAM portion is approximately double the size of the first storage capacity of each NAND flash chip.

* * * * *

UNITED STATES PATENT AND TRADEMARK OFFICE
CERTIFICATE OF CORRECTION

PATENT NO. : 9,880,778 B2
APPLICATION NO. : 14/936486
DATED : January 30, 2018
INVENTOR(S) : Monish Shah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 74 days.

Signed and Sealed this
Twenty-fifth Day of September, 2018

Andrei Iancu
*Director of the United States Patent and Trademark Office*